US010667358B1

(12) United States Patent
Marx

(10) Patent No.: US 10,667,358 B1
(45) Date of Patent: May 26, 2020

(54) LOAD CONTROL USING AC SIGNALLING WITH UNIQUE SIGNATURES

(71) Applicant: Keith Bernard Marx, Richardson, TX (US)

(72) Inventor: Keith Bernard Marx, Richardson, TX (US)

( * ) Notice: Subject to any disclaimer, the term of this patent is extended or adjusted under 35 U.S.C. 154(b) by 0 days.

(21) Appl. No.: 16/352,812

(22) Filed: Mar. 13, 2019

Related U.S. Application Data

(60) Provisional application No. 62/752,529, filed on Oct. 30, 2018, provisional application No. 62/642,451, filed on Mar. 13, 2018.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 45/14* | (2020.01) |
| *H02J 13/00* | (2006.01) |
| *H05B 45/20* | (2020.01) |
| *H05B 45/24* | (2020.01) |

(52) U.S. Cl.
CPC ........ *H05B 45/14* (2020.01); *H02J 13/00009* (2020.01); *H02J 13/0034* (2013.01); *H05B 45/20* (2020.01); *H05B 45/24* (2020.01)

(58) Field of Classification Search
None
See application file for complete search history.

(56) References Cited

U.S. PATENT DOCUMENTS

| | | | |
|---|---|---|---|
| 4,746,809 | A | 5/1988 | Coleman |
| 5,614,811 | A | 3/1997 | Sagalovich |
| 6,016,038 | A | 1/2000 | Mueller |
| 6,211,626 | B1 | 4/2001 | Lys |

(Continued)

FOREIGN PATENT DOCUMENTS

| | | |
|---|---|---|
| CN | 104871646 B | 8/2005 |
| CN | 202374539 U | 8/2012 |

(Continued)

OTHER PUBLICATIONS

Arole—"Implementation of Lamp Dimmer and Fan Controller System: A PSoC Approach", International Journal of Scientific & Engineering Research; vol. 6, Issue 1, Jan. 2015 (pp. 1-7).

(Continued)

*Primary Examiner* — Ahn Q Tran
(74) *Attorney, Agent, or Firm* — Mark P Kahler

(57) ABSTRACT

A load control system includes a controller that modifies an alternating current (AC) signal at a controller input to provide, on a cycle-by-cycle basis, an encoded AC signal that exhibits a unique AC signature at a controller output. The unique AC signature is associated with a particular user-selectable load characteristic. The load control system also includes a load circuit that receives the encoded AC signal. The load circuit includes a decoder that decodes the encoded AC signal to determine the unique AC signature of the encoded AC signal. In response to determining the unique AC signature of the encoded AC signal, the load circuit changes a load characteristic of the load circuit to exhibit the particular user-selectable load characteristic associated with the unique AC signature.

18 Claims, 12 Drawing Sheets

(56) References Cited

U.S. PATENT DOCUMENTS

| | | |
|---|---|---|
| 7,038,399 B2 | 5/2006 | Lys |
| 7,358,679 B2 | 4/2008 | Lys |
| 8,294,379 B2 | 10/2012 | Liu |
| 8,957,595 B2 | 2/2015 | Johnston |
| 2011/0032085 A1* | 2/2011 | Maros ................ H05B 37/0263 340/12.32 |
| 2011/0043124 A1 | 2/2011 | Johnston |
| 2011/0316441 A1* | 12/2011 | Huynh ............... H05B 33/0845 315/291 |
| 2014/0197751 A1 | 7/2014 | Grajcar |
| 2014/0333219 A1 | 11/2014 | Zijlstra |
| 2015/0235552 A1* | 8/2015 | Cai ......................... H04B 3/54 340/12.32 |
| 2015/0237700 A1* | 8/2015 | Woytowitz ......... H05B 33/0863 315/307 |
| 2016/0262244 A1* | 9/2016 | Campbell .......... H05B 37/0263 |

FOREIGN PATENT DOCUMENTS

| | | |
|---|---|---|
| CN | 205793521 U | 12/2016 |
| EP | 1289217 B1 | 3/2003 |
| WO | 0190828 A2 | 11/2001 |

OTHER PUBLICATIONS

Cooper—"LED lighting must work with legacy dimming technologies": LEDs Magazine, May 31, 2011 (pp. 1-10).

Truchsess—"Simple Circuit Communication Over Low-Voltage Power Lines": Electronic Design, Apr. 15, 2013 (pp. 1-7).

Maxim—"MAXM22510 / MAKX22511 2.5k VRMS Complete Isolated RS-485/RS-422 Module Transceiver + Power", Maxim Integrated Spec Sheet 29-100335, Rev. 1, Jul. 2018 (pp. 1-23).

\* cited by examiner

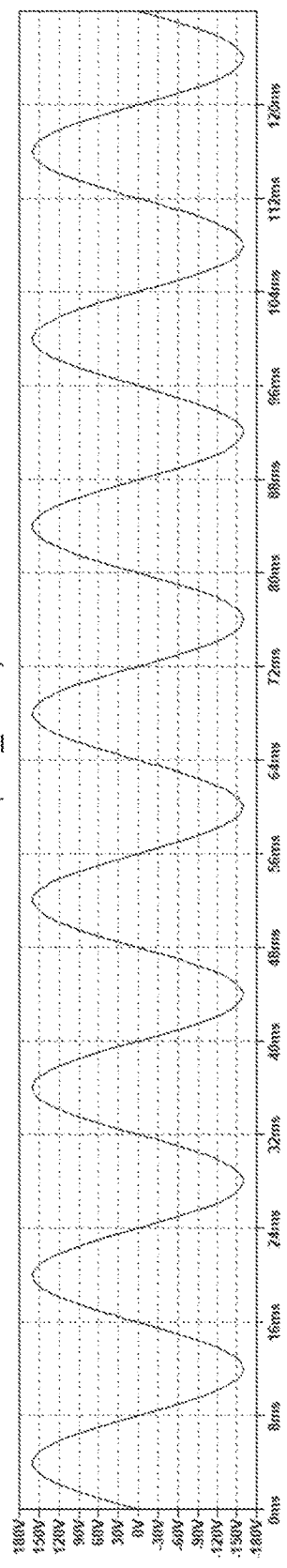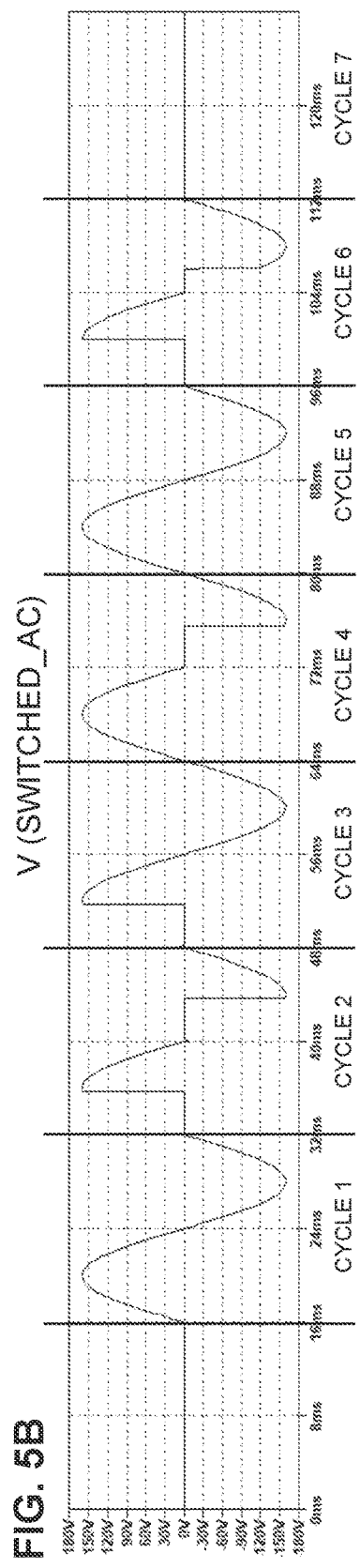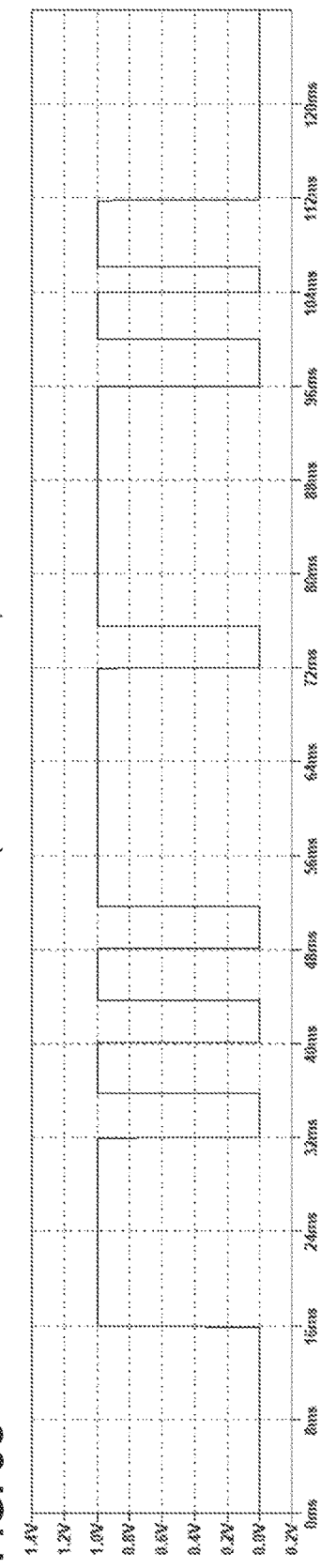

Flowchart - General Operation of Control Panel (Wall Mount & Switch Plate):

Process 1: Signal Transmit across Switched_AC line

Flowchart - Arbitration Operation of Control Panel (Wall Mount & Switch Plate):

Flowchart - Arbitration Operation of Control Panel (Wall Mount & Switch Plate):

LOAD CONTROL USING AC SIGNALLING WITH UNIQUE SIGNATURES

CROSS REFERENCE TO RELATED PATENT APPLICATIONS

This patent application claims priority to Provisional U.S. Patent Application Ser. No. 62/642,451, filed Mar. 13, 2018, by inventor Keith Bernard Marx, the disclosure of which is incorporated herein by reference in its entirety. This patent application further claims priority to Provisional U.S. Patent Application Ser. No. 62/752,529, filed Oct. 13, 2018, by inventor Keith Bernard Marx, the disclosure of which is incorporated herein by reference in its entirety.

BACKGROUND

The disclosures herein relate generally to controlling one or more loads, and more specifically to controlling one or more loads using AC signals.

BRIEF SUMMARY

In one embodiment, a method is disclosed for modifying, by a controller, an alternating current (AC) signal supplied to a controller input to provide, on a cycle-by-cycle basis, an encoded AC signal that exhibits a unique AC signature at a controller output, the unique AC signature being associated with a particular user-selectable load characteristic. The method also includes receiving, by a load circuit, the encoded AC signal. The method further includes decoding, by a decoder in the load circuit, the encoded AC signal to determine the unique AC signature of the encoded AC signal. The method still further includes changing, by the load circuit, a load characteristic of the load circuit to exhibit the particular user-selectable load characteristic associated with the unique AC signature.

In another embodiment, a load control system is disclosed that includes a controller that modifies an alternating current (AC) signal at a controller input to provide, on a cycle-by-cycle basis, an encoded AC signal that exhibits a unique AC signature at a controller output. The unique AC signature is associated with a particular user-selectable load characteristic. The load control system also includes a load circuit that receives the encoded AC signal. The load circuit includes a decoder that decodes the encoded AC signal to determine the unique AC signature of the encoded AC signal. In response to determining the unique AC signature of the encoded AC signal, the load circuit changes a load characteristic of the load circuit to exhibit the particular user-selectable load characteristic associated with the unique AC signature.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 5A is a representation of the V (AC_HOT) signal that the controller receives in the disclosed load control system.

FIG. 5B is a representation of the V (SWITCHED_AC) signal generated by the controller of the disclosed load control system.

FIG. 5C is a representation of the V (TRIAC ENABLE) signal that the controller employs for switching TRIACs in one embodiment of the disclosed load control system.

DETAILED DESCRIPTION

In one embodiment, a load control system is disclosed that includes a control panel at which the user may select one or more characteristics that the user desires a load to exhibit. For example, in an embodiment wherein the load circuit includes a load that is an array of light emitting diode (LED) lights, the user may push a control panel button or move a slider switch to indicate a desired 50% of maximum lighting intensity. In response to this user input, the control panel modifies an AC hot input signal to provide a modified AC output signal that includes a unique signature, i.e. or code, on an AC cycle-by-cycle basis. This unique signature corresponds to 50% lighting intensity. The load circuit includes a signal decoder which acts as a detector of the particular unique signature. The signal decoder supplies the unique signature to a microcontroller that instructs the load in the load circuit to exhibit the particular characteristic (e.g. 50% lighting intensity) corresponding to the unique signature, in response to the user's selection. In the very next AC signal cycle, the user may select a variation of the same characteristic (e.g. 25% lighting intensity) or a different characteristic (e.g. a particular color of multiple colors) and the system will encode the unique signature to again modify the AC signal supplied to the load. In response, the load circuit detects this new desired lighting characteristic and changes state to correspond to the new desired lighting characteristic. These state changes are implemented quickly on a cycle-by-cycle basis.

Figure 1:
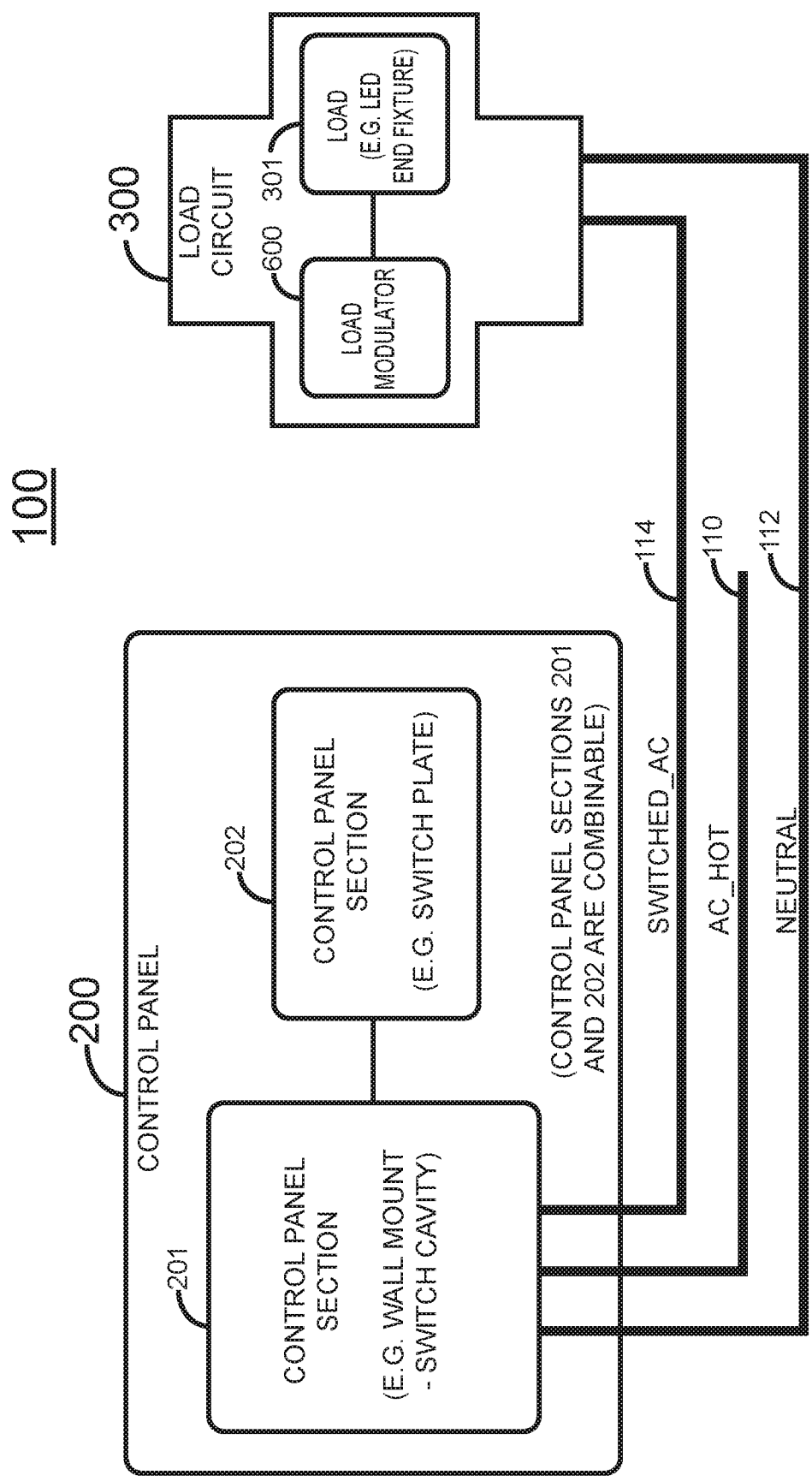
FIG. 1 is block diagram of one embodiment of the disclosed load control system.

FIG. 1 shows a block diagram of one embodiment of the disclosed load control system as load control system 100. Load control system 100 includes a control panel 200 that includes control panel section 201 and control panel section 202. Depending on the particular application, control panel sections 201 and 202 may be combined together. Load control system 100 also includes a load circuit 300 that includes a load 301 and a load modulator 600 that will be discussed below in more detail. Load 301 may be an LED lighting array or other device for which control of a characteristic of the device is desired by the user.

An AC_HOT signal 110 is supplied to control panel section 201, as shown. This AC_HOT signal 110 may be supplied by the power mains. A NEUTRAL line 112 is coupled between control panel section 101 and load circuit 300. A SWITCHED_AC line 114 also is coupled between control panel section 201 and load circuit 300, as shown. The SWITCHED_AC signal is the modified AC signal which incorporates the unique AC signature corresponding to the user's selection of the desired load characteristic.

In one embodiment, control panel section 201 may be situated in the wall cavity typically used for light switches mounted on a wall. Control panel section 202 may be situated at the switch plate typically used for such light switches. Control panel section 201 and 202 may be located at other locations depending on the particular application and mounting space available. As mentioned, control panel sections 201 and 202 may be combined together if a particular application calls for it.

Figure 2:
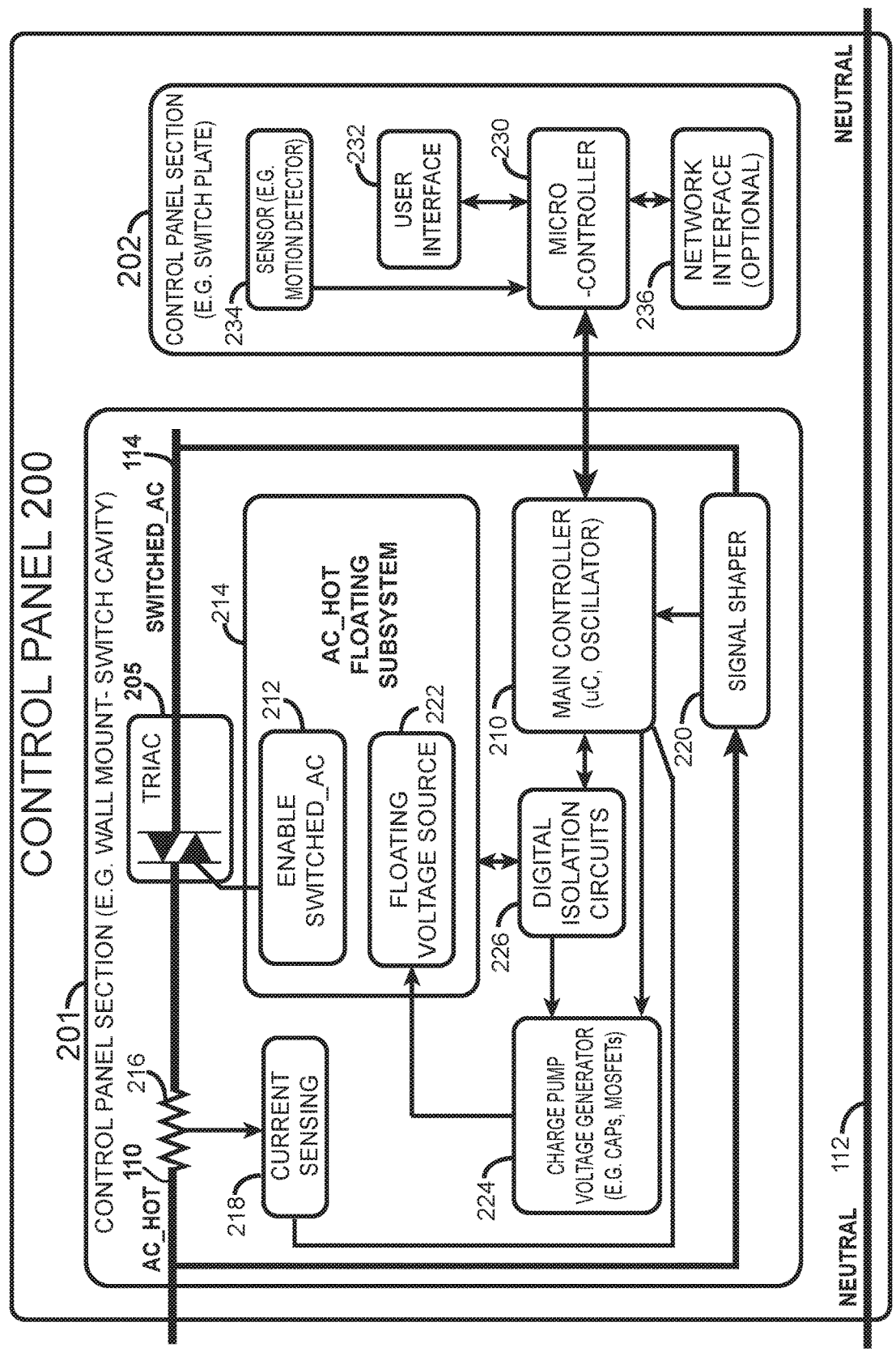
FIG. 2 is a block diagram of one embodiment of the control panel of the disclosed load control system.

FIG. 2 is a more detailed block diagram of control panel 200 that includes control panel section 201 that may be mounted in the wall mount switch cavity if desired. Control panel 200 also includes control panel section 202 that may be mounted at the switch plate, if desired. Control panel section 201 includes a main controller 210 that may include a microcontroller and an oscillator that is employed as a time-base. Main controller 210 is operatively coupled to microcontroller 230 of control panel section 202 so that main controller 210 and microcontroller 230 may exchange information. Control panel section 202 include a user interface 232 so that the user may select the particular characteristic or characteristics that the used desires the load to exhibit. User interface 232 may be a dimmer switch or slide switch that the user adjusts to indicate the desired light intensity. User interface 232 may alternatively be a touch-sensitive panel that displays a plurality of selections that the user may choose to indicate the particular characteristic or characteristics that the user desires the load to exhibit. Microcontroller 230 supplies this user selection to main controller 210. Control panel section 202 may also include a sensor 234 that senses one or more conditions local to control panel 200. For example, sensor 234 may sense motion, CO2, temperature, humidity and other local conditions. Control panel section 202 may optionally include a wired or wireless network interface 236 so that microcontroller 230 may communicate with control panel section 201 or other devices. Control panel section 201 may optionally include a wireless interface (not shown) for communication between main controller 210 and microcontroller 230 or with other devices.

Control panel section 201 includes a bi-directional switching device 205 (e.g. TRIAC) that couples to both the input AC_HOT line 110 and the output SWITCHED_AC line 114, as shown. TRIAC 205 modifies the AC_HOT signal to generate the modified SWITCHED_AC in response to an ENABLE SWITCHED_AC signal provided to its gate input by the ENABLE SWITCHED_AC circuit 212 coupled thereto. The ENABLE SWITCHED_AC circuit 212 is part of the AC_HOT floating subsystem 214 which is discussed in more detail below.

Control panel section 201 includes a current sensing resistor 216 that current sensing circuit 218 monitors to determine the instantaneous current through TRIAC 205. Control panel section 201 also includes a signal shaper circuit 220, for example a comparator circuit, that shapes the AC_HOT signal provided to its input. The output of signal shaper circuit 220 couples to an input of main controller 210 to provide a shaped representation of the AC_HOT signal to main controller 210.

AC_HOT floating subsystem 214 includes a floating voltage source 222, as shown in FIG. 2. A charge pump 224 (for example a MOSFET-capacitor circuit) couples to floating voltage source 222 to supply floating voltage source 222 with charge. Main controller 210 couples to change pump 224 and AC_HOT floating subsystem 214 via digital isolation circuits 226.

Figure 3:
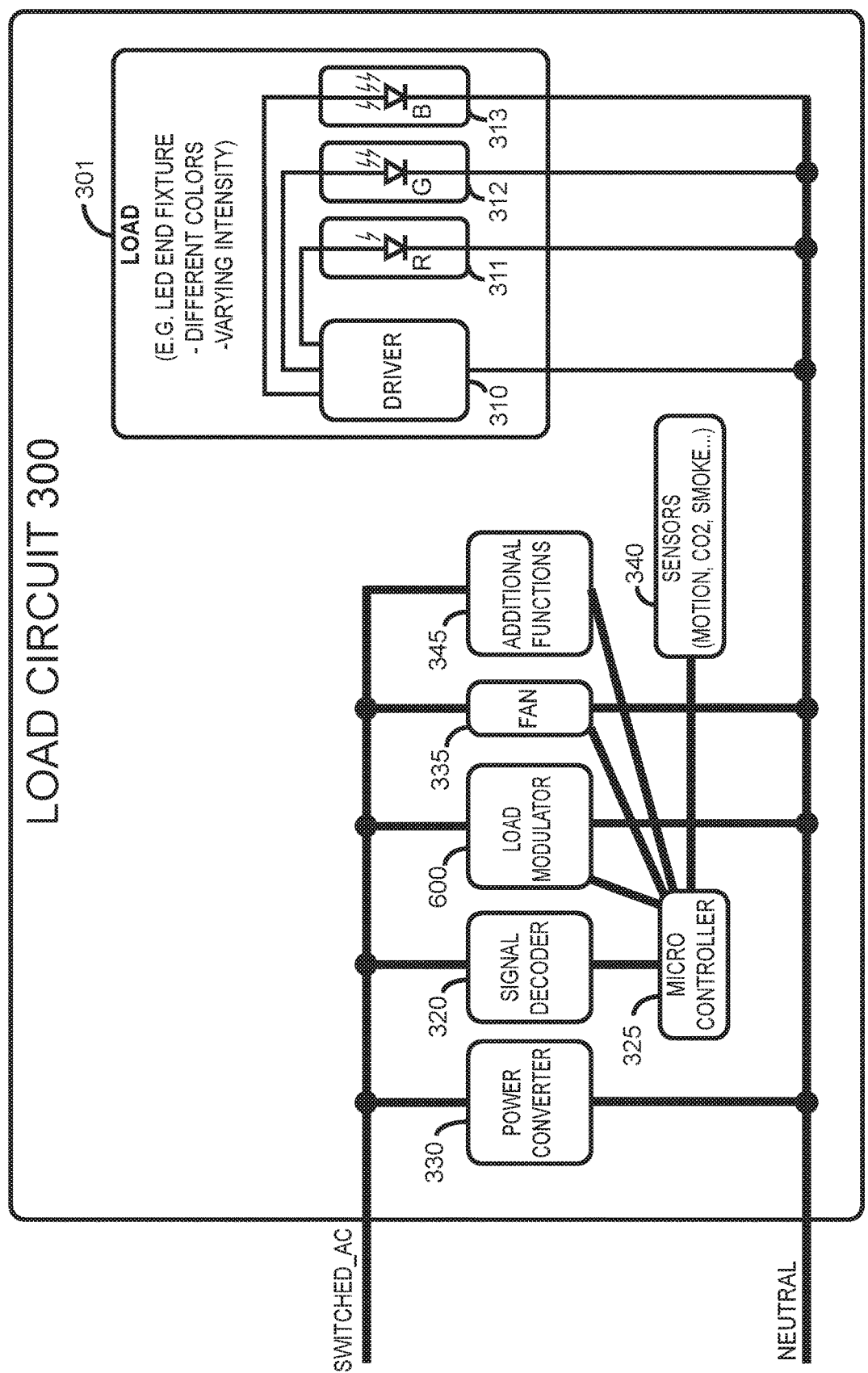
FIG. 3 is block diagram of one embodiment of the load circuit of the disclosed load control system.

FIG. 3 is a block diagram of load circuit 300 that includes load 301 and load modulator 600. Load 301 includes a driver 310 coupled to colored LEDs 311, 312 and 313 which respectively exhibit R, G, B colors of different intensity or brightness in accordance the drive signal that driver 310 supplies in accordance with the particular unique AC signature that signal decoder 320 detects on the SWITCHED_AC hot line. In more detail, microcontroller 325 receives the decoded signal from signal decoder 320. Microcontroller 325 recognizes the decoded signal from signal decoder 320 as corresponding to the particular characteristic or characteristics that the user desires for load 301 to exhibit, for example, a particular level of brightness or a particular color. In response to the decoded signal from signal decoder 320, microcontroller 325 instructs load 301 to exhibit the particular characteristic desired by the user. Load 301 changes state accordingly.

Load circuit 300 also includes a power converter 330 that generates a DC voltage from the SWITCHED_AC signal to provide DC power to the elements of load circuit 300. Load circuit 300 includes an optional fan 335, the on or off state of which the user may control as one of the selectable characteristics of the load. Load circuit 300 may include additional user controllable functions as well. Load circuit 300 may further include sensors 340 (for example a motion sensor, a CO2 sensor, a temperature sensor, a humidity sensor, a smoke sensor) which may report information sensed remotely at load circuit 300 back to control panel section 201 of the load control system 100 shown in FIG. 1.

Figure 4:
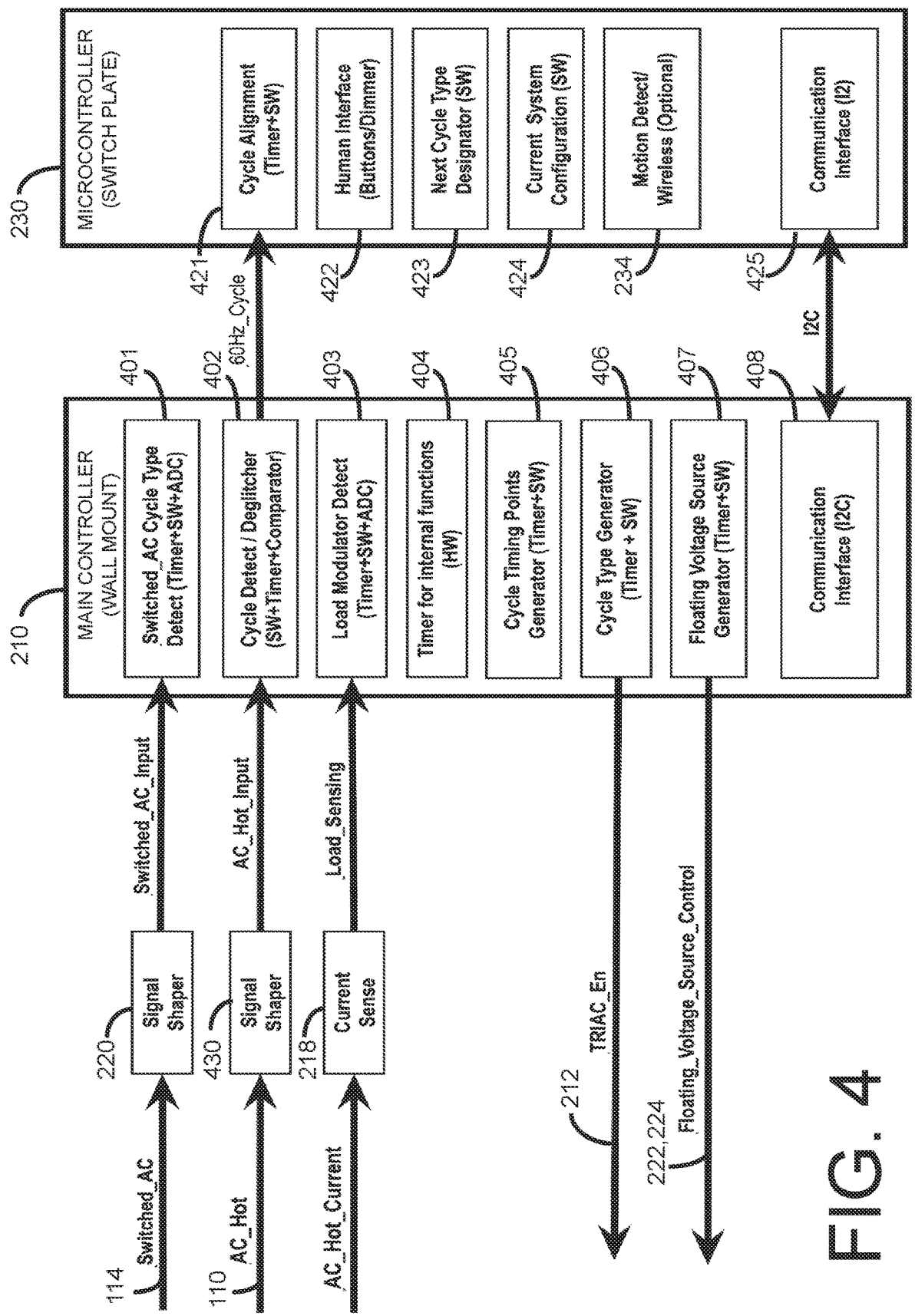
FIG. 4 is a block diagram representation of the controllers in one embodiment of the disclosed load control system.

FIG. 4 is a more detailed block diagram of the system blocks implemented within the main controller 210 of control panel section 201 and within microcontroller 230 of control panel section 202. FIG. 4 shows the AC_HOT signal at 110 and the SWITCHED_AC signal at output 114. FIG. 4 also shows signal shaper 220 with a SWITCHED_AC_INPUT signal it its output, and a signal shaper 430 with an AC_HOT_INPUT signal at its output. The SWITCHED_AC_INPUT signal and the AC_HOT_INPUT signal are conditioned versions of SWITCHED_AC and AC_HOT signals. The AC_HOT_CURRENT is a differential pair of lines coming from each side of the sense resistor 216 of FIG. 2.

Main controller 210 may include a SWITCHED_AC cycle type detector 401. Main controller 210 may also include a cycle detect/deglitcher 402. Main controller 210 may further includes a load modulator detect block 403 to monitor variations in the load current that indicates particular events or conditions at the load. Main controller 210 also includes a timer 404 for internal functions and a cycle timing points generator 405. Main controller 210 further includes a cycle type generator 406 and a floating voltage source generator 407. Main controller 210 also includes a communication interface, such as an I2C protocol interface, as shown.

Microcontroller 230 may include a cycle alignment block 421 as well as a human interface 422, such as buttons or a slide switch dimmer control, or a touch sensitive display panel. Microcontroller 230 may also include a next cycle type designator 423 that instructs the next cycle type (e.g. the particular AC signature) to be generated according to the users desired load characteristic selection. Microcontroller 230 may further include a current system configuration block 424 as well as an optional motion detector 234. Microcontroller 230 may include a communication interface 425, such as the I2C protocol interface shown in FIG. 4.

FIGS. 5A, 5B and 5C are timing diagrams illustrative of voltage vs. time for the V (AC_HOT) signal, the V (SWITCHED_AC) signal and the V (TRIAC ENABLE) signal, respectively. FIG. 5A shows a representative 60 Hz AC line signal from the power main as V (AC_HOT). Referring now to FIG. 5C, this drawing shows the V (TRIAC ENABLE) signal that instructs TRIAC 205 to turn on and conduct at particular parts of each AC current cycle as demonstrated by the output waveform V (SWITCHED_AC) of FIG. 5B. For example, consider CYCLE 1 of the V (SWITCHED_AC) signal of FIG. 5B. From 16 ms to 32 ms, the V (TRIAC ENABLE) signal is high thus instructing TRIAC 205 to turn on and conduct. This results in the entire full AC signal cycle passing through to the output of the TRIAC as seen in CYCLE 1 of FIG. 5B.

In another example, referring now to the V (TRIAC ENABLE) signal of FIG. 5C between 32 ms and 48 ms, it is noted that between 32 ms and 36 ms the V (TRIAC ENABLE) signal is low. This means that TRIAC 205 is off, thus allowing no current to pass during this time period as seen in FIG. 5B where the output of the TRIAC 205 is off between 32 ms and 36 ms of CYCLE 2.

Continuing now in FIG. 5C, between 36 ms and 40 ms the V (TRIAC ENABLE) signal is high which turns on TRIAC 205 to pass a half peak through the TRIAC output to provide the V (SWITCHED_AC) signal.

From 40 ms to 44 ms, the V (TRIAC ENABLE) signal of FIG. 5C is again low which turns off the TRIAC during this portion of CYCLE 2. This results in the V (SWITCHED_AC) signal returning to zero as observed in FIG. 5B.

Continuing further now to the V (TRIAC ENABLE) signal of FIG. 5C between 44 ms and 48 ms, it is noted that the V (TRIAC ENABLE) signal is again high. This means that TRIAC 205 is on, thus allowing a half negative peak to pass during this time period as seen in FIG. 5B where the output of the TRIAC 205 is on between 44 ms and 48 ms of CYCLE 2.

In this manner, TRIAC 205 can generate a large number of unique AC signatures, wherein each AC signal may correspond to a different characteristic that the user desires the load to exhibit. Cycles 3-7 illustrate a sampling of other unique AC signatures that may be generated. TABLE 1 below is a representation of some of the many different AC signatures that TRIAC 205 of control panel section 201 may generate to instruct the load regarding which particular characteristic the load should exhibit.

TABLE 1 below shows 10 representative load states that one embodiment of the load circuit may exhibit.

TABLE 1

Unique AC Load Control States

| Load States | First Half Cycle | Second Half Cycle |
| --- | --- | --- |
| 1$^{st}$ load state | Full positive pulse | Full negative pulse |
| 2$^{nd}$ load state | Half positive pulse | Half negative pulse |
| 3$^{rd}$ load state | Full positive pulse | Half negative pulse |
| 4$^{th}$ load state | Half positive pulse | Full negative pulse |

TABLE 1-continued

Unique AC Load Control States

| Load States | First Half Cycle | Second Half Cycle |
| --- | --- | --- |
| 5$^{th}$ load state | Positive pulse, delayed ZC start | Negative pulse with unaltered ZC |
| 6$^{th}$ load state | Full positive pulse | Negative pulse with delayed ZC start |
| 7$^{th}$ load state | Positive pulse, delayed ZC start | Negative pulse with delayed ZC start |
| 8$^{th}$ load state | Positive pulse, delayed ZC end | Negative pulse with unaltered ZC |
| 9$^{th}$ load state | Full positive pulse | Negative pulse with delayed ZC end |
| 10$^{th}$ load state | Positive pulse, delayed ZC end | Negative pulse with delayed ZC end |

Figure 6:
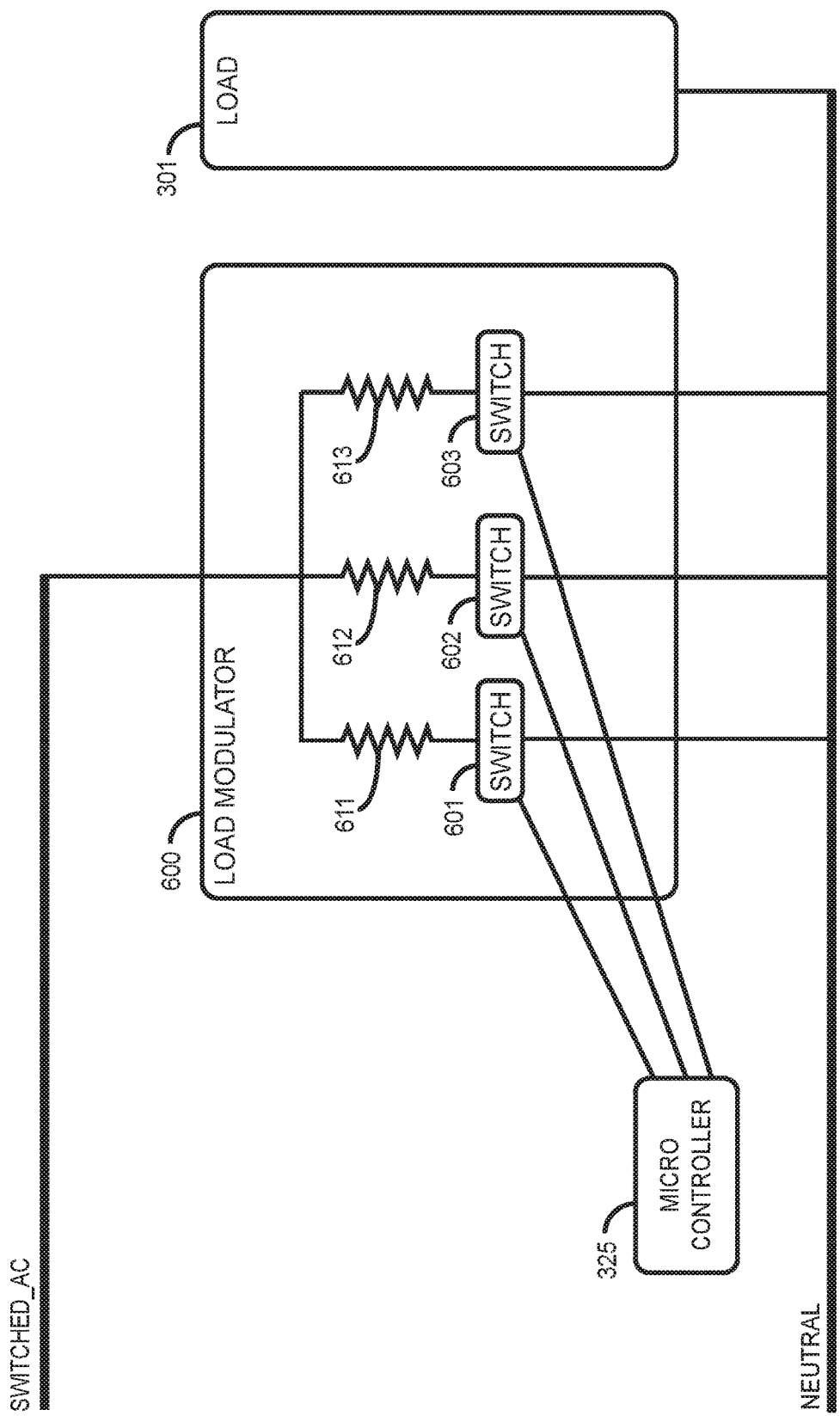
FIG. 6 is a representation of the load modulator employed in the load circuit of one embodiment of the disclosed load control system.

FIG. 6 is a simplified embodiment of load modulator 600 that illustrates its operation at a high level. Load modulator 600 varies the load exhibited by load 301 in a manner that is perceptible, i.e. detectable, back at main controller 210 of control section 201 of FIG. 2. Main controller 210 monitors the SWITCHED_AC output 115 to determine the present current level. In this particular example shown in FIG. 6, the microcontroller 325 in load circuit 300 of FIG. 3, may instruct load modulator 600 to switch the one, two or three of resistors 611, 612 and 613, or combinations thereof, to connect in parallel with load 301, i.e. in parallel with SWITCHED_AC and NEUTRAL as seen in FIG. 6. This alters the load current observed by main controller 210 back at control panel 200. By altering load current in this manner, different conditions observed at load circuit 300 can be reported back to main controller 210. For example, if sensor 340 of FIG. 3 detects a particular observed condition such as smoke, in response microcontroller 325 may instruct switch 601 to connect resistor 611 in parallel with load 301. This changes the load current and can be seen by main controller 210. If sensor 340 detects another particular observed condition such as motion, in response microcontroller 325 may instruct switch 602 to connect resistor 612 in parallel with load 301. This also changes the load current and can be seen by main controller 210. Alternatively, if sensor 340 detects a yet another particular observed condition such as high levels of $CO_2$, in response microcontroller 325 may instruct switch 601 to connect resistor 613 in parallel with load 301. This again changes the load current and can be seen by main controller 210. In this manner, main controller 210 is apprised of remote conditions observed at load circuit 300.

For the purposes of the flowcharts of FIG. 7-12, CP refers to the control panel sections 201 and 202. CP switch plate refers to control section 202. Wall mount microcontroller refers to the main controller 210 in control panel section 201. End fixture refers to the remote load circuit 300. In one embodiment, multiple control panels 200, each with its own bi-directional switching device 205 (e.g. a TRIAC), can reside on the same SWITCHED_AC line to control a plurality of load circuits 300. In other words, multiple control panels 200 and multiple circuits 300 may be coupled to a common SWITCHED_AC line. In one embodiment, if a CP issues one instruction, it is for all end fixtures not just an individual one. This approach desirably avoids having to reference or assign a name to each end fixture.

Figure 7:
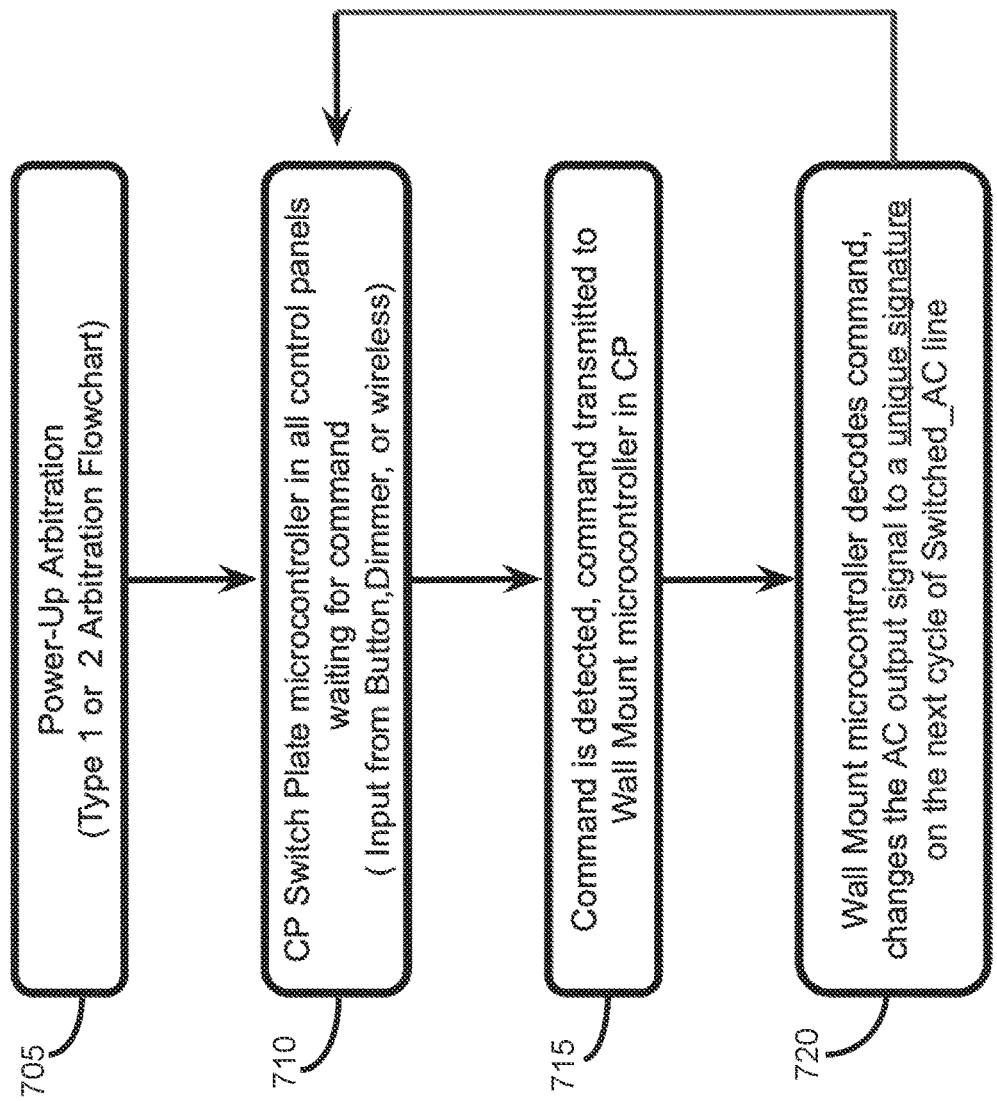
FIG. 7 is a flowchart that shows the general operation of the control panel.

FIG. 7 is a flowchart that shows the general operation of the control panel 200 that performs Process 1, namely wherein a unique AC signature signal is transmitted on the Switched_AC line 114 as stated in FIG. 7. As per block 705, a representative control panel 200 powers up and initiates arbitration such as Type 1 arbitration among control panels (CPs) as shown in more detail in FIG. 10 which is discussed below, or Type 2 arbitration as shown in more detail in FIG. 11 which is also discussed below. As per block 710, the CP switch plate microcontroller 230 in all control panels 200 waits for a command from a user. This command may be input by the user actuating a button or a dimmer switch, or via a wireless command, as stated in FIG. 7. Microcontroller 230 is referenced as the CP switch place microcontroller for convenience, but not by way of limitation to being mounted at a switch plate. As stated above, control panel sections 201 and 202 may be situated combined together at a common location. As per block 715, the command is detected and transmitted to the main microcontroller 210 which may be referenced as the wall-mount main microcontroller 210 in control panel 200 for convenience, but not by way of limitation to being situated in a wall mount. As per block 720, main microcontroller 210 decodes the unique command and, in response, changes the AC output signal to exhibit a unique signature on the next cycle of the Switched-AC line 114.

Figure 8:
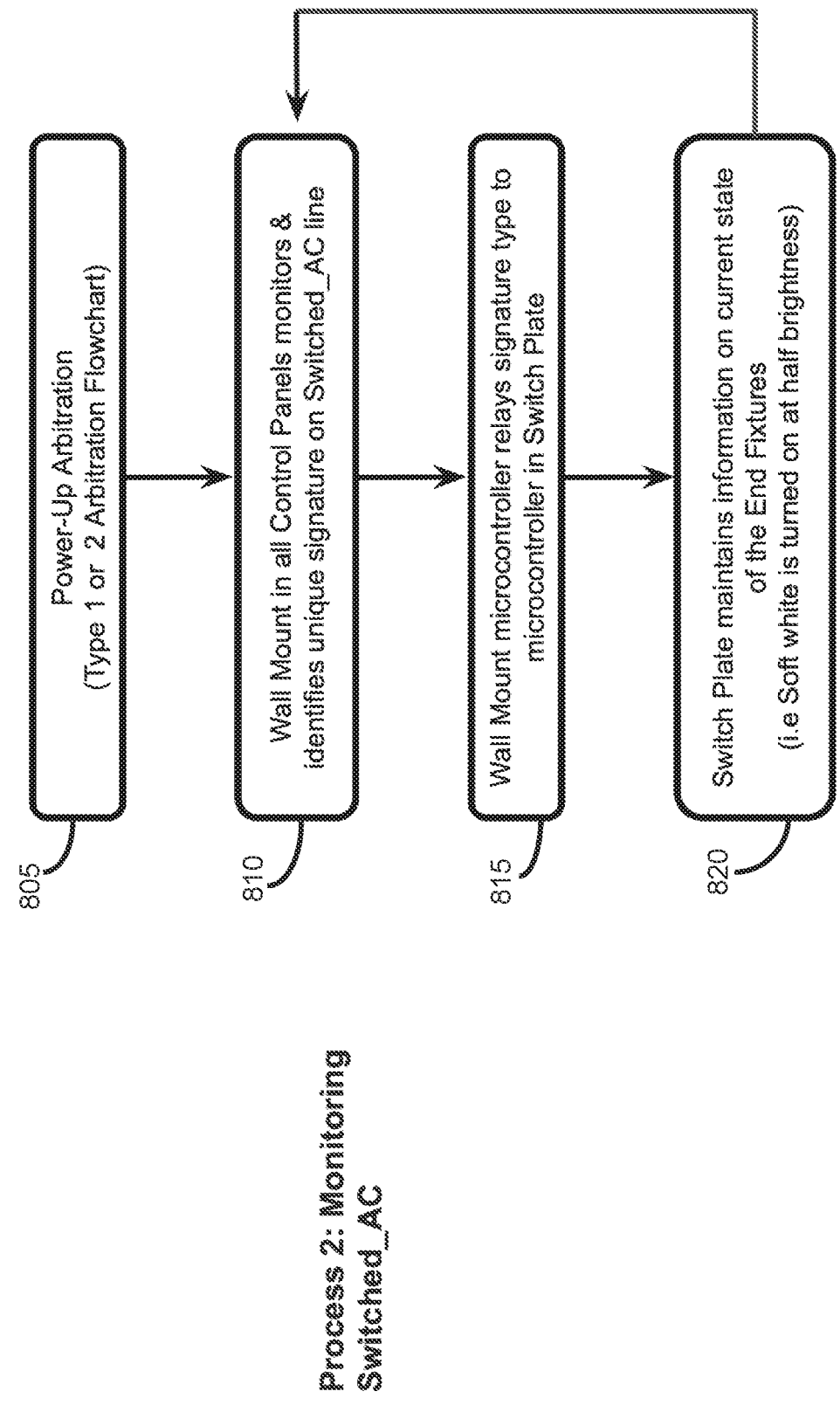
FIG. 8 is a flowchart that further depicts the general operation of the control panel.

FIG. 8 is a flowchart that provides additional detail with respect to the general operation of a representative control panel 200 with respect to a Process 2, namely monitoring the Switched_AC line 114 for unique signatures. As per block 805, and similarly to the flowchart of FIG. 7, control panel 200 may power up to use either Type 1 or Type 2 arbitration, as explained in more detail below. As per block 810, the wall-mount main microcontroller 210 in all control panels 200 monitors and identifies unique signatures on Switched_AC line 114. As per block 815, wall-mount main microcontroller 210 relays the signature type to the switch plate microcontroller 230. As per block 820, switch plate microcontroller 230 maintains information with respect to the current state of load circuit 300, which is alternatively referred to above as an "end fixture" of the system. For example, the current state of load circuit 300 may be "soft white is turned on at half brightness", or many other states as well.

Figure 9:
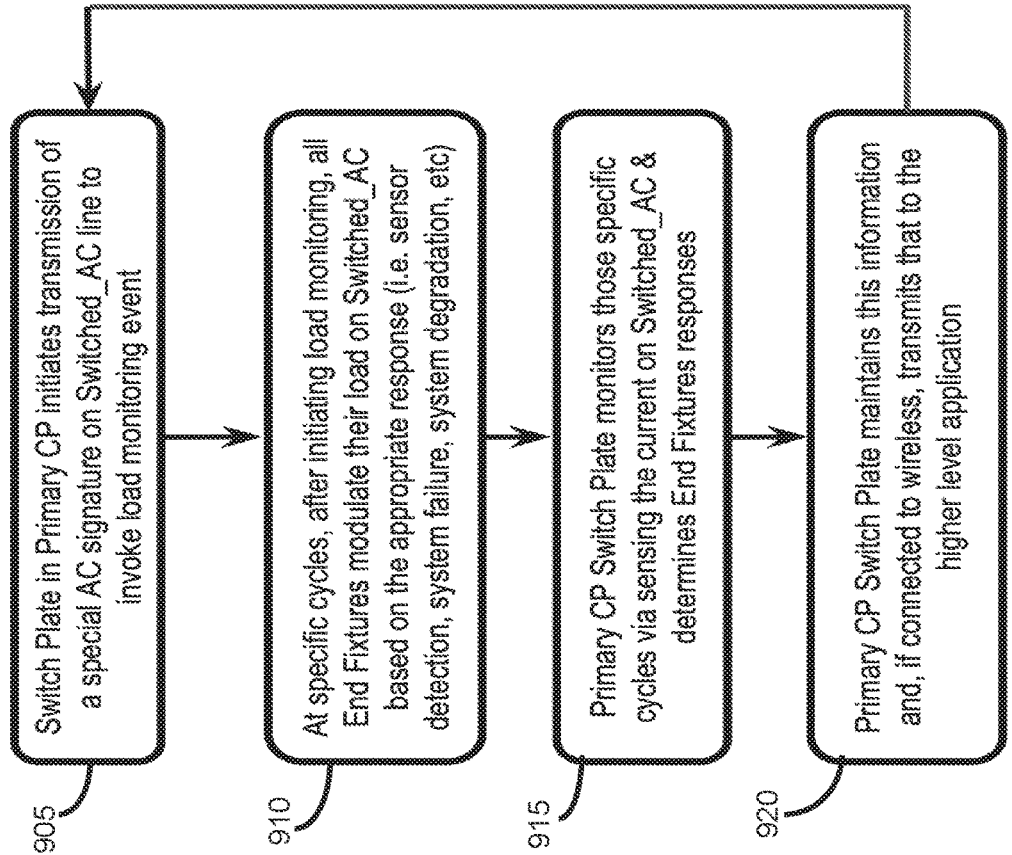
FIG. 9 is a flowchart that depicts the load monitoring function of the control panel.

FIG. 9 is a flowchart that illustrates a representative load monitoring function of the control panels 200 with respect to a Process 3, namely load monitoring by a control panel 200 of the Switched_AC line 114 to determine conditions sensed at load circuit 300 by sensors 340 of load circuit 300. More particularly, as per block 905, switch plate microcontroller 230 in a primary control panel 200 initiates transmission of a special AC signature on the Switched_AC line 114 to invoke a load monitoring event. In one embodiment as per block 910, at specific cycles after initiating load monitoring, all remote load circuits 300 (e.g. end fixtures) modulate, i.e. change, their load on Switched_AC line 114 based on the appropriate response (i.e. sensor detection, system failure, and system degradation, for example). As per block 915, primary switch plate microcontroller 230 monitors those specific cycles via sensing the current on Switched_AC line 114 and determines load monitoring circuit 300 responses. As per block 920, primary switch plate microcontroller 230 maintains this response information and, if wireless connected, transmits this response information to a higher level application.

It should be again noted that multiple control panels may be coupled to a common SWITCHED_AC line 114 that supplies power with unique AC signatures to multiple load circuits 300.

Figure 10:
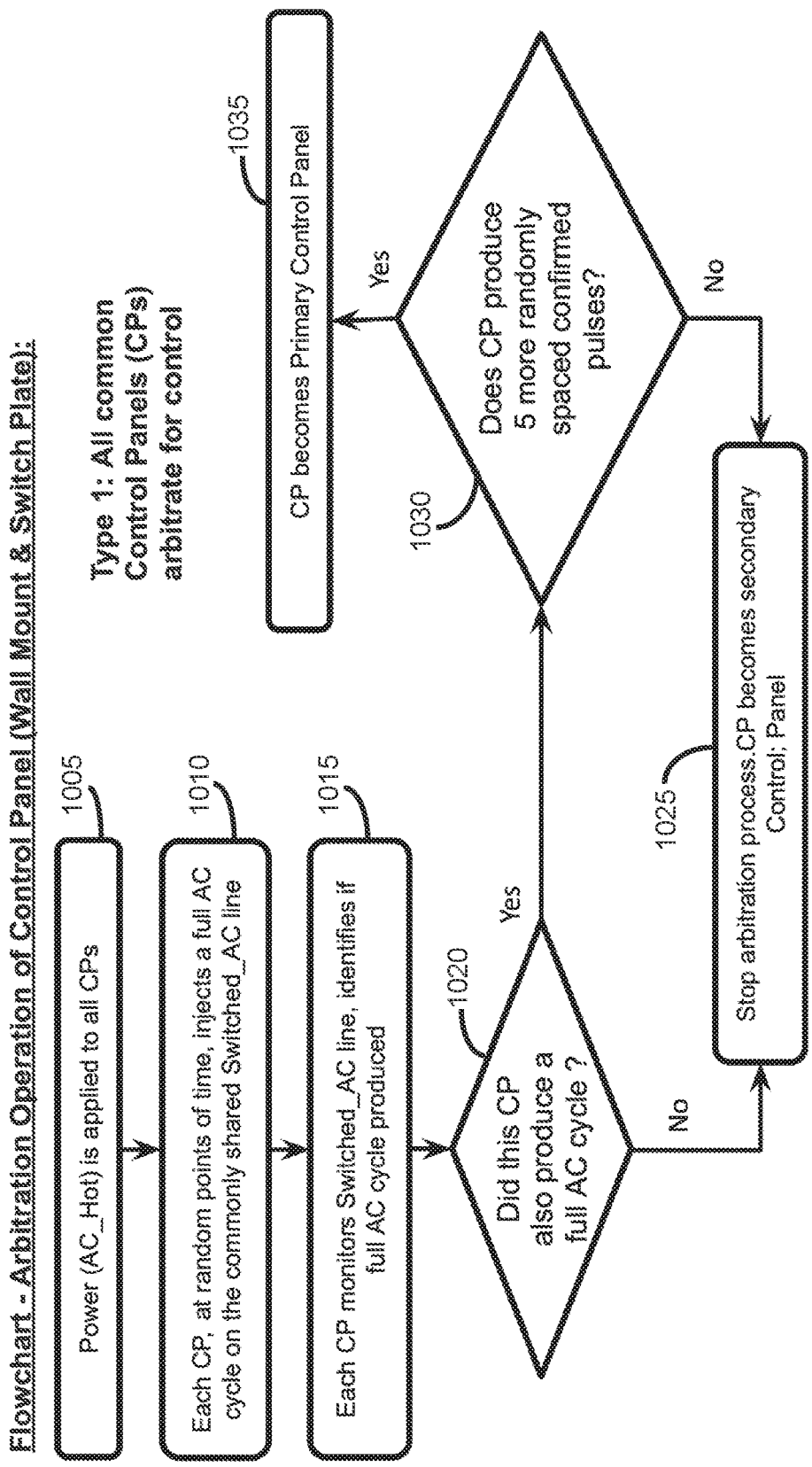
FIG. 10 is a flowchart that depicts Type 1 arbitration wherein all control panels arbitrate for control.

FIG. 10 is a flowchart that shows arbitration operations of control panels 200. This flowchart shows Type 1 arbitration wherein all common control panels arbitrate for control. As per block 1005, AC_Hot power is applied to all control panels (CPs) 200. As per block 1010, each control panel 200, at random points in time, injects a full AC cycle on the commonly shared Switched_AC line. As per block 1015, each control panel 200 monitors the commonly shared Switched_AC line and identifies if a full AC cycle is produced. Next, as per decision block 1015, the control panel 200 test to determine if this control panel also produced a full AC cycle. If, this control panel did not also produce a full AC cycle, then the arbitration process stops for this control panel and, as per block 1025, the arbitration process of this control panel stops, and this control panel becomes a secondary control panel. However, if at decision block 1020, this control panel determines that this control panel also produced a full AC cycle, then process flow continues to decisions block 1030 as shown. In one embodiment, at decision block 1030, the control panel tests to determine, "Does control panel (CP) produce 5 more randomly spaced confirmed pulses?" If the control panel does find 5 more randomly spaced confirmed pulses, then process flow continues to block 1035 at which this control panel 200 becomes the primary control panel. However, if this control panel 200 determines that this control panel (CP) did not produce 5 more randomly spaced confirmed pulses, then process flow continues to block 1025 at which the arbitration process for this control panel stops and this control panel 200 becomes a secondary control panel.

Figure 11:
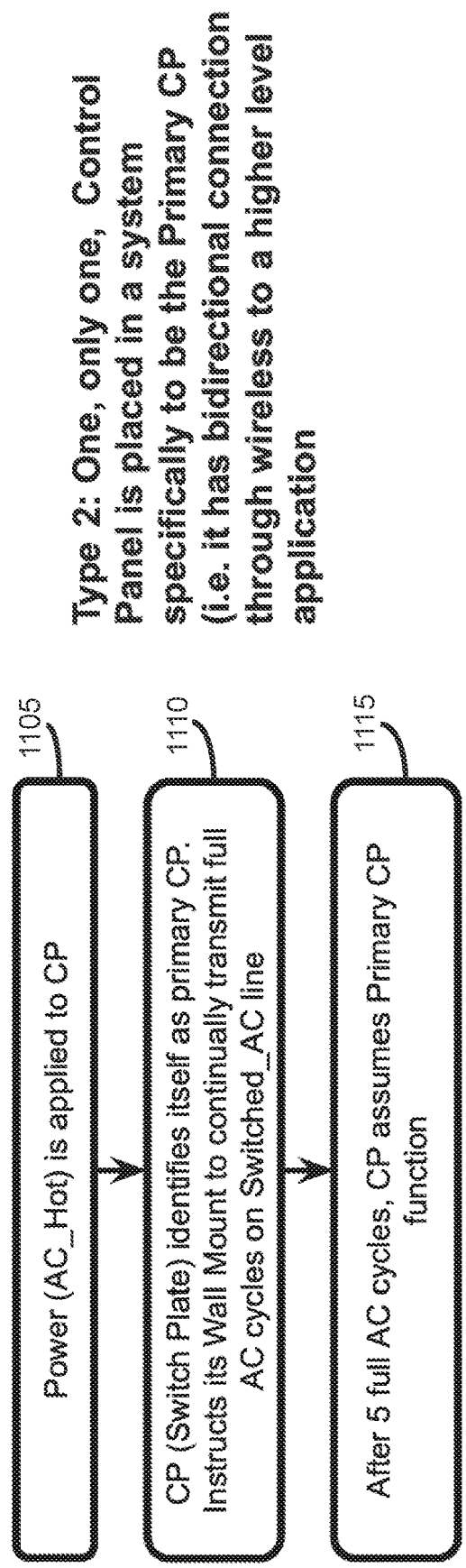
FIG. 11 is a flowchart that depicts Type 2 arbitration wherein only one control panel is placed in a system of control panels to specifically be the primary control panel.

FIG. 11 is a flowchart that shows alternative arbitration operations of control panels 200. More specifically, this flowchart depicts Type 2 arbitration, namely arbitration wherein only one control panel is placed in a system of control panels to specifically be the primary control panel (CP) 200 among multiple control panels of the system. In one embodiment, this primary control panel CP employs bidirectional connection through wireless communication to a higher level application. As per block 1105, power (i.e. AC_Hot) is applied to this control panel (CP). As per block 1110, CP switch plate microcontroller 230 identifies itself as being in the primary control panel. This CP switch plate microcontroller 230 instructs wall mount main microcontroller 210 to continually transmit full AC cycles on the Switched_AC line 114. As per block 1115, after 5 full AC cycles, this control panel 200 assumes primary control panel (CP) function and thus commences acting as the primary control panel.

Figure 12:
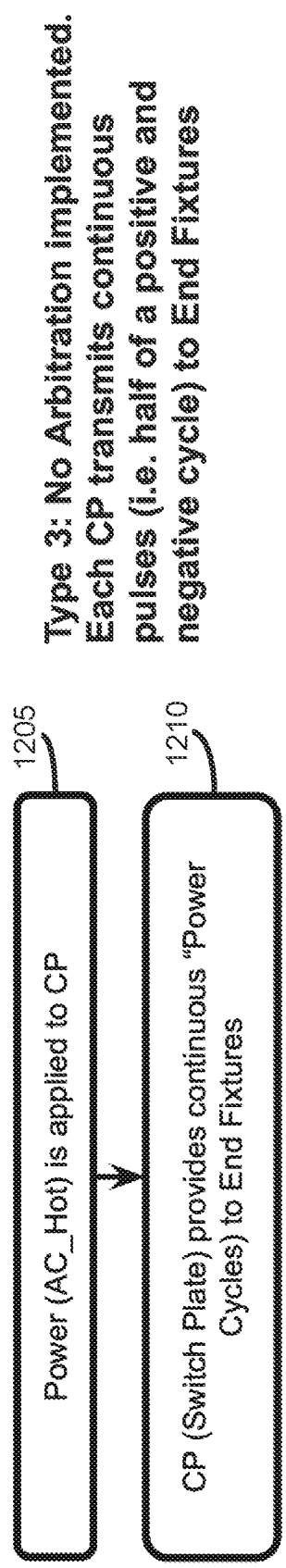
FIG. 12 is a flowchart that depicts Type 3 arbitration variant wherein no arbitration is implemented.

FIG. 12 is a flowchart that depicts further alternative arbitration operations of control panels 200 wherein no arbitration is implemented. In this particular embodiment, each control panel (CP) 200 transmits continuous pulses (i.e. half positive and half negative cycles) to remote load circuits 300, e.g. the end fixtures. As per block 1205, the power (i.e. AC_Hot) is applied to each control panel 200. As per block 1210, each switch plate microcontroller 230 provides a stream of continuous power cycles to load circuits 300, e.g. end fixtures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Process steps may be performed in an order different than those presented for purposes of example Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving an AC input signal by a controller AC input of a controller, the controller including the controller AC input and a controller AC output;
modifying, by the controller, the AC input signal to provide, on a cycle-by-cycle basis, an encoded AC signal that exhibits a unique AC signature at the controller AC output, the unique AC signature being associated with a particular user-selectable load characteristic,
supplying, by the controller AC output, the encoded AC signal to an AC supply load line;
receiving, by a load circuit, the encoded AC signal from the AC supply load line, wherein the load circuit includes both a load and a load modulator;
decoding, by a decoder in the load circuit, the encoded AC signal to determine the unique AC signature of the encoded AC signal;
changing, by the load circuit, a load characteristic of the load circuit to the particular user-selectable load characteristic associated with the unique AC signature;
sensing, by a plurality of environmental information sensors of the load circuit, respective different environmental conditions observed by the plurality of environmental information sensors;
modulating, by the load modulator of the load circuit, the load of the load circuit to encode sensed environmental condition information into current variations that the load circuit sends back to the controller via the AC supply load line, and
current sensing, by the controller, the current on the AC supply load line to decode the encoded sensed environmental condition information received by the controller back from the load circuit.

2. The method of claim 1, wherein the step of sensing, by a plurality of environmental information sensors of the load circuit, includes sensing at least one of smoke, CO2, temperature, humidity and motion conditions.

3. The method of claim 1, wherein the step of changing, by the load circuit, a load characteristic of the load circuit includes instructing at least one of a plurality of lighting devices in the load circuit to change brightness.

4. The method of claim 2, wherein the load circuit includes a plurality of lighting devices that exhibit different respective colors, the unique AC signature instructing at least one of the lighting devices to activate to exhibit a particular color corresponding to the unique AC signature.

5. The method of claim 1, wherein the controller receives a user selection from a user input, the user selection indicating a particular load characteristic that the user desires the load circuit to exhibit, and in response to the user input the controller provides the encoded AC signal to the AC supply load line, wherein the encoded AC signal exhibits a unique AC signature signal corresponding to the user selection.

6. The method of claim 1, wherein the controller includes a first controller section and a second controller section.

7. The method of claim 6, wherein the first controller section is installable in a switch cavity associated with a wall switch.

8. The method of claim 7, wherein the second controller section is installable at a wall location associated with the wall switch.

9. The method of claim 6, wherein the first controller section and the second controller section are combined in a common structure.

10. A system comprising:
a controller including a controller AC input that receives an AC input signal, the controller also including a controller AC output, wherein the controller modifies the AC input signal to provide, on a cycle-by-cycle basis, an encoded AC signal that exhibits a unique AC signature at the controller AC output, the unique AC signature being associated with a particular user-selectable load characteristic;
an AC supply load line coupled to the controller AC output to receive the encoded AC signal from the controller;
a load circuit coupled to the AC supply load line to receive the encoded AC signal from the AC supply load line, the load circuit including both a load and a load modulator, the load circuit further including a decoder that decodes the encoded AC signal to determine the unique AC signature of the encoded AC signal, wherein the load circuit changes a load characteristic of the load circuit to the particular user-selectable load characteristic associated with the unique AC signature;
the load circuit further including a plurality of environmental information sensors that sense different respective environmental conditions observed by the plurality of environmental information sensors, thus providing sensed environmental condition information;
wherein the load modulator of the load circuit modulates the load of the load circuit to encode sensed environmental condition information into current variations that the load circuit sends back to the controller via the AC supply load line, and
a current sensor in the controller that performs current sensing on the current on the AC supply load line to decode the encoded sensed environmental condition information received by the controller back from the load circuit via the AC supply load line.

11. The system of claim 10, wherein the sensed environmental condition information at the load circuit includes at least one of smoke, CO2, temperature, humidity and motion conditions.

12. The system of claim 11, wherein the load circuit includes a plurality of lighting devices and wherein the unique AC signature instructs at least one of the lighting devices to change brightness.

13. The system of claim 12, wherein the plurality of lighting devices exhibits different respective colors, the unique AC signature instructing at least one of the lighting devices to activate to exhibit a particular color corresponding to the unique AC signature.

14. The system of claim 10, wherein the controller receives a user selection from a user input, the user selection indicating a particular load characteristic that the user desires the load circuit to exhibit, and in response to the user input the controller provides the encoded AC signal to the AC supply load line, wherein the encoded AC signal exhibits a unique AC signature signal corresponding to the user selection.

15. The system of claim 10, wherein the controller includes a first controller section and a second controller section.

16. The system of claim 15, wherein the first controller section is installable in a switch cavity associated with a wall switch.

17. The system of claim 16, wherein the second controller section is installable at a wall location associated with the wall switch.

18. The system of claim 15, wherein the first controller section and the second controller section are combined in a common structure.

* * * * *